Nov. 11, 1952 S. KNEE Re. 23,578
COMBINED WALLET AND PURSE
Original Filed April 12, 1948
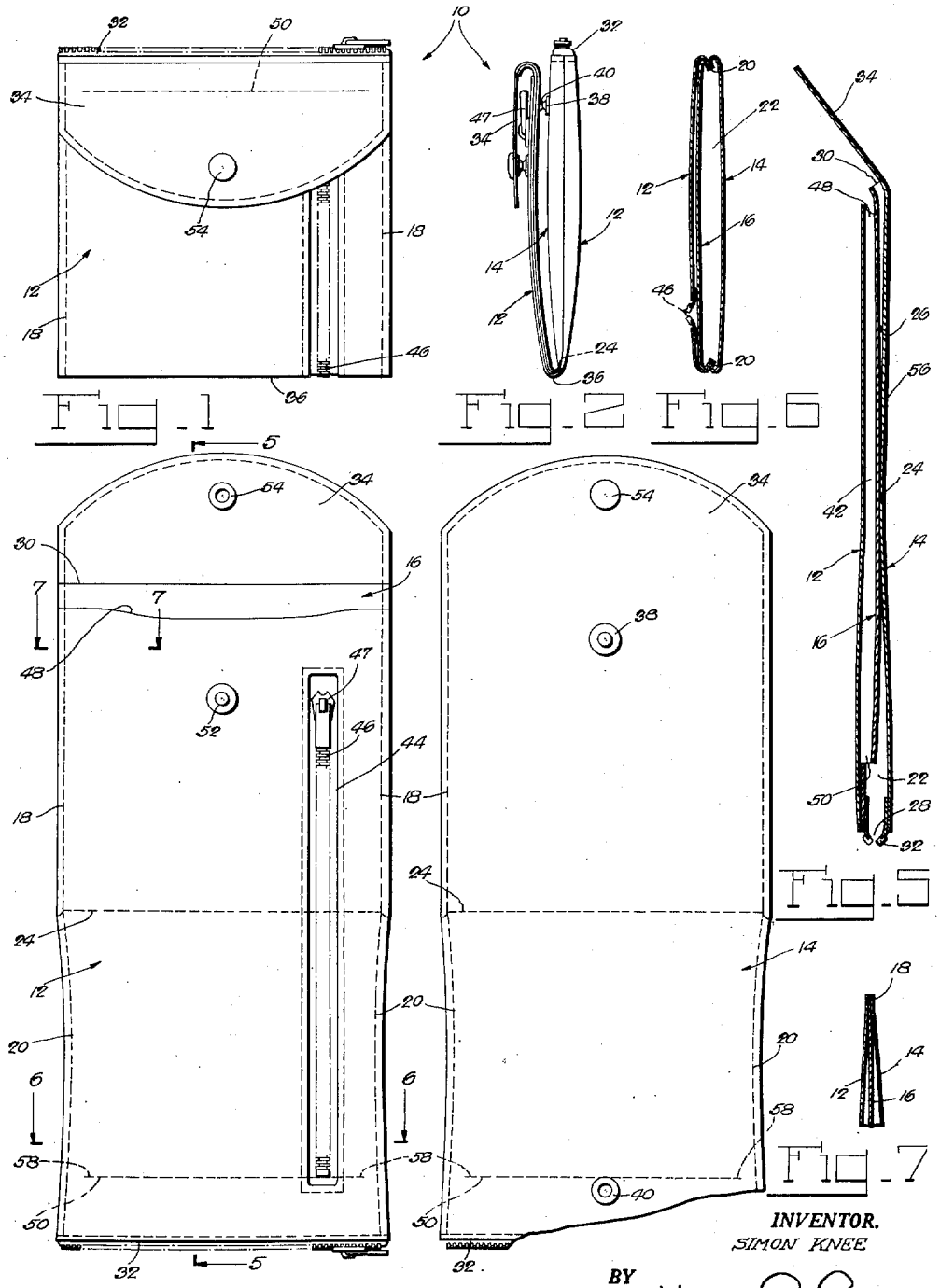
INVENTOR.
SIMON KNEE
BY Harry Cohen
ATTORNEY.

Reissued Nov. 11, 1952

Re. 23,578

UNITED STATES PATENT OFFICE 23,578

COMBINED WALLET AND PURSE

Simon Knee, Newark, N. J.

Original No. 2,581,029, dated January 1, 1952, Serial No. 20,493, April 12, 1948. Application for reissue March 18, 1952, Serial No. 277,188

4 Claims. (Cl. 150—35)

Matter enclosed in heavy brackets [ ] appears in the original patent but forms no part of this reissue specification; matter printed in italics indicates the additions made by reissue.

This invention relates to a combination billfold and change purse.

In accordance with this invention a combined wallet or billfold and a change purse is so constructed that access may be had in various ways to the billfold or wallet for selective removal of one or more bills or other papers therefrom. More particularly, such access to the wallet or billfold may be had alternatively either through the change purse, when the latter is opened, or through an opening externally of the change purse, and this may be accomplished in either case while the purse and wallet elements of the combined article are in folded relation. The construction of a combined bill fold and change purse having these desirable features constitutes one of the objects of the present invention.

Another object of the invention is generally to provide a combined wallet and change purse which is of improved construction and advantageous in use.

The above and other objects, features and advantages of this invention will be fully understood from the following description, reference being had to the accompanying illustrative drawings.

In the drawings:

Fig. 1 is a side view of a combined wallet and purse embodying the present invention, the purse and wallet elements being in relatively folded side-by-side relation;

Fig. 2 is an end view thereof;

Fig. 3 is a side view of one side of the combined wallet and purse in the unfolded condition thereof;

Fig. 4 is a view of the opposite side of the combined wallet and purse in the unfolded condition thereof;

Fig. 5 is a sectional view on the line 5—5 of Fig. 3;

Fig. 6 is a sectional view on the line 6—6 of Fig. 3;

Fig. 7 is a detail sectional view on the line 7—7 of Fig. 3.

Referring now to the drawings in detail, the combined wallet and purse 10 embodying the present invention comprises the outer walls 12 and 14, respectively, and an inner or intermediate wall 16 stitched together at their adjacent side edges co-extensively by the lines of stitching 18 and by the inseams 20, the latter being disposed in the interior of the purse compartment 22. Stitching 18 extends to the adjacent ends of the inseams 20. Walls 12, 14 and 16 may be formed of any suitable pliable or foldable sheet material such as, for example but without limitation, leather, simulated leather, fabric, sheet plastic, etc. Walls 14 and 16 are stitched to each other intermediate the lengths thereof by a transverse line of stitching 24 forming the compartment 22 of the change purse and also an additional compartment 26. Compartments 22 and 26 have end openings 28 and 30, respectively, which as here shown are releasably closed by the closure devices here shown as a slide-operated fastener or zipper 32 and a foldable flap 34, respectively. It will be noted that when the combined wallet and purse is in its folded condition as shown in Figs. 1 and 2 the stitching 24 is located adjacent the fold line 36 and it will be observed that the openings 28 and 30 of the compartments 22 and 26 are at the top of the combined article. Companion separable snap fastener members 38 and 40 are provided on wall 14, in suitably spaced relation, so that when the combined article is folded, it may be releasably secured in folded condition by said fastener elements, as shown in Fig. 2.

The billfold or wallet compartment 42 is defined by the outer wall 12 and by the inner wall 16. Said compartment 42 is of an appropriate size to receive paper currency in flat, unfolded condition, when the article is in its unfolded condition as shown by Figs. 3 to 5. The billfold is provided with a longitudinally extending opening 44 to permit the insertion or removal of said bills in the flat, unfolded condition thereof, and as here shown said wallet opening is provided with a suitable closure, the latter being preferably a slider operated fastener or zipper 46 having the usual slider 47.

In addition to the opening 44, the billfold is provided with an end opening 48 which is located externally of the combined article and also with an end opening 50 which is located internally of said article. The closure flap 34 provides a closure for the wallet opening 48, as well as for the opening 30 of the compartment 26. Preferably, as here shown separable companion snap fasteners 52 and 54 are provided on wall 12 and on flap 34, respectively, for releasably securing said closure flap in its closed position. It will be noted that closure flap 34 is formed as an integral extension of wall 14, but it will be understood that said flap may be in the form of a separate piece stitched or otherwise secured in position. Further it will be understood that it is within the scope of the present invention to omit the compartment 26, if desired, in which case wall 16 need only be long enough to form the inner wall of the compartment 22, in which case the inner wall of the wallet compartment 42 would be constituted by the inner wall of the change purse and the wall portion 56 of outer wall 14.

The internal end opening 50 of the wallet compartment 42 is located near the top of the change purse compartment 22 in the normal position thereof shown in Fig. 1. Said opening 50 may be in the form of a slit in inner wall 16 and extends transversely for substantially the full length of the latter, the opposite ends 58 of said slit terminating adjacent to but short of the adjacent inseams 20 respectively.

It will be observed that when the purse and wallet parts of the referred article are in their folded side-by-side relation, as shown in Figs. 1 and 2, access may be had to the interior of the purse by opening the closure 32, and if the user of the article desires to remove one or more bills from the wallet, this may be accomplished without opening the closure 34 and without disturbing the attached folded relation of the purse and the wallet. More specifically, when the closure 32 is opened, one or more bills may be removed from the wallet through the internal end opening 50 thereof, by pulling the selected paper money or bill through said opening 50 and through the change purse opening 28. In this connection it will be understood that the length of the billfold compartment 42 is such that the bills therein project slightly beyond end opening 50 into the change purse compartment 22 so that the denominations of the different bills may be readily observed and so that one or more of the bills of the desired denomination or denominations may be selected and withdrawn, according to the desires of the user. On the other hand, if the user of the article does not wish to open the change purse, access may nevertheless be conveniently obtained to the interior of the wallet without unfolding the article, and for this purpose it is merely necessary to unfasten the closure flap 34 so that the desired bill or bills may be removed from the wallet through the external end opening 48. Further in this connection it will be observed that access may be simultaneously had to compartment 26 through its end opening 30, and of course coins or other articles may be kept in said compartment as well as in compartment 22.

It will be observed that the opposed walls of the purse compartment 22 are secured to each other at their adjacent edges for the full depth of the purse, i. e., from its bottom defined by stitching 24 to its top defined by closure 32 for opening 28. Accordingly, opening of closure 32 does not open the purse at the side edges thereof as in the case of a purse having hinged U-shaped frames. Although the securement of the side edges of the walls of the purse for the full depth thereof is an advantage, it will be understood that the invention in respect to other features thereof may be applied to a purse of U-shaped hinged frame type.

Various changes in the details of construction and in the form and arrangement of parts, and certain features may be used without others, without departing from the underlying idea or principles of the invention within the scope of the appended claims.

*Certain of the features described herein are disclosed and claimed in my copending application for the reissue of my Patent No. 2,579,833, dated December 25, 1951.*

Having thus described my invention, what I claim and desire to secure by Letters Patent is:

[1. A combined billfold and purse, comprising a pair of outer walls and an inner wall all joined to each other at their adjacent side edges, coextensively thereof, one of said outer walls being also joined to said inner wall along a transverse line intermediate the opposite ends of said walls and forming pockets disposed at opposite sides, respectively, of said transverse line of juncture, each of said pockets having a transversely extending end opening, the other of said outer walls and said inner wall defining the billfold, said billfold having a transversely extending end opening adjacent one of said first mentioned end openings, said three walls being foldable about a transverse line whereby all of said end openings are disposed adjacent each other, and releasable closure means for said openings.]

[2. A combined billfold and purse, comprising a pair of outer walls and an inner wall all joined to each other at their adjacent side edges, coextensively thereof, one of said outer walls being also joined to said inner wall along a transverse line intermediate the opposite ends of said walls and forming pockets disposed at opposite sides, respectively, of said transverse line of juncture, each of said pockets having a transversely extending end opening, the other of said outer walls and said inner wall defining the billfold, said billfold having a transversely extending end opening adjacent one of said first mentioned end openings, said three walls being foldable about a transverse line whereby all of said end openings are disposed adjacent each other, said end opening of the billfold being located externally of said pocket defining walls, and one of said walls having a flap extension foldable over said end opening of the billfold as a closure thereof.]

[3. A combined billfold and purse, comprising a pair of outer walls and an inner wall all joined to each other at their adjacent side edges, coextensive thereof, one of said outer walls being also joined to said inner wall along a transverse line intermediate the opposite ends of said walls and forming pockets disposed at opposite sides, respectively, of said transverse line of juncture, each of said pockets having a transversely extending end opening, the other of said outer walls and said inner wall defining the billfold, said billfold having a transversely extending end opening adjacent one of said first mentioned end openings, said three walls being foldable about a transverse line whereby all of said end openings are disposed adjacent each other, said end opening of the billfold being located externally of said pocket defining walls, and separate closure means for said end opening of the billfold and for the end opening of one of said pockets, respectively.]

4. A combined billfold and purse, comprising a pair of outer walls and an inner wall all joined to each other at their adjacent side edges, coextensively thereof, one of said outer walls being also joined to said inner wall along a transverse line intermediate the opposite ends of said walls and forming pockets disposed at opposite sides, respectively, of said transverse line of juncture, each of said pockets having a transversely extending end opening, the other of said outer walls and said inner wall defining the billfold, said billfold having a transversely extending end opening adjacent one of said first mentioned end openings, said three walls being foldable about a transverse line whereby all of said end openings are disposed adjacent each other, said end opening of the billfold being located externally of said pocket defining walls, said billfold also having a transversely extending opening formed in one of said pockets, and separate closure means for said first mentioned end opening of the billfold and for the end opening of one of said pockets.

*5. A combined billfold and purse, comprising a pair of outer walls and an inner wall all joined to each other at their adjacent side edges, coextensively thereof, one of said outer walls being also joined to said inner wall along a transverse line intermediate the opposite ends of said walls and forming pockets disposed at opposite sides, respectively, of said transverse line of juncture, each of said pockets having a transversely extending end opening, the other of said outer walls and said inner wall defining the billfold, said billfold having a transversely extending end opening adjacent one of said first mentioned end openings, said three walls being foldable about a transverse line whereby all of said end openings are disposed adjacent each other, said end opening of the billfold being located externally of said pocket defining walls, said billfold also having a transversely extending opening formed in one of said pockets, and separate closure means for said first mentioned end opening of the billfold and for the end opening of one of said pockets, said second mentioned opening of the billfold being disposed adjacent said first mentioned opening of said billfold and adjacent said end openings of said pockets, when said three walls are folded about said transverse line.*

*6. A combined billfold and purse, comprising a pair of outer walls and an inner wall all joined to each other at their adjacent side edges, coextensively thereof, one of said outer walls being also joined to said inner wall along a transverse line intermediate the opposite ends of said walls and forming pockets disposed at opposite sides, respectively, of said transverse line of juncture, each of said pockets having a transversely extending end opening, the other of said outer walls and said inner wall defining the billfold, said billfold having a transversely extending end opening adjacent one of said first mentioned end openings, said three walls being foldable about a transverse line whereby all of said end openings are disposed adjacent each other, said end opening of the billfold being located externally of said pocket defining walls, said billfold also having a transversely extending opening formed in one of said pockets, and spaced inwardly of the aforesaid opening of said last mentioned pocket, and separate closure means for said first mentioned end opening of the billfold and for the end opening of one of said pockets.*

*7. A combined billfold and purse, comprising a pair of outer walls and an inner wall all joined to each other at their adjacent side edges, coextensively thereof, one of said outer walls being also joined to said inner wall along a transverse line intermediate the opposite ends of said walls and forming pockets disposed at opposite sides, respectively, of said transverse line of juncture, each of said pockets having a transversely extending end opening, the other of said outer walls and said inner wall defining the billfold, said billfold having a transversely extending end opening adjacent one of said first mentioned end openings, said three walls being foldable about a transverse line whereby all of said end openings are disposed adjacent each other, said end opening of the billfold being located externally of said pocket defining walls, said billfold also having a transversely extending opening formed in one of said pockets, first closure means for closing both said first mentioned end opening of the billfold and the end opening of one of said pockets, and second closure means for closing both said second mentioned opening of the billfold and the end opening of the other of said pockets.*

SIMON KNEE.

REFERENCES CITED

The following references are of record in the file of this patent or the original patent:

UNITED STATES PATENTS

| Number | Name | Date |
|---|---|---|
| 1,084,101 | Nover | Jan. 13, 1914 |
| 1,451,205 | Clairmont | Apr. 10, 1923 |
| 1,476,697 | Dwyer | Dec. 11, 1923 |
| 2,298,543 | Schmidt | Oct. 13, 1942 |
| 2,346,433 | Herbener | Apr. 11, 1944 |
| 2,397,393 | Wetterhahan | Mar. 26, 1946 |
| 2,428,707 | Hardy | Oct. 7, 1947 |
| 2,488,444 | St. Thomas | Nov. 15, 1949 |
| 2,519,456 | Hack | Aug. 22, 1950 |

FOREIGN PATENTS

| Number | Country | Date |
|---|---|---|
| 93,707 | Switzerland | July 1, 1922 |